Nov. 15, 1949    W. SCHAELCHLIN ET AL    2,488,438
CONTROL SYSTEM FOR ALTERNATING-CURRENT
MULTISPEED MOTORS
Filed June 11, 1948
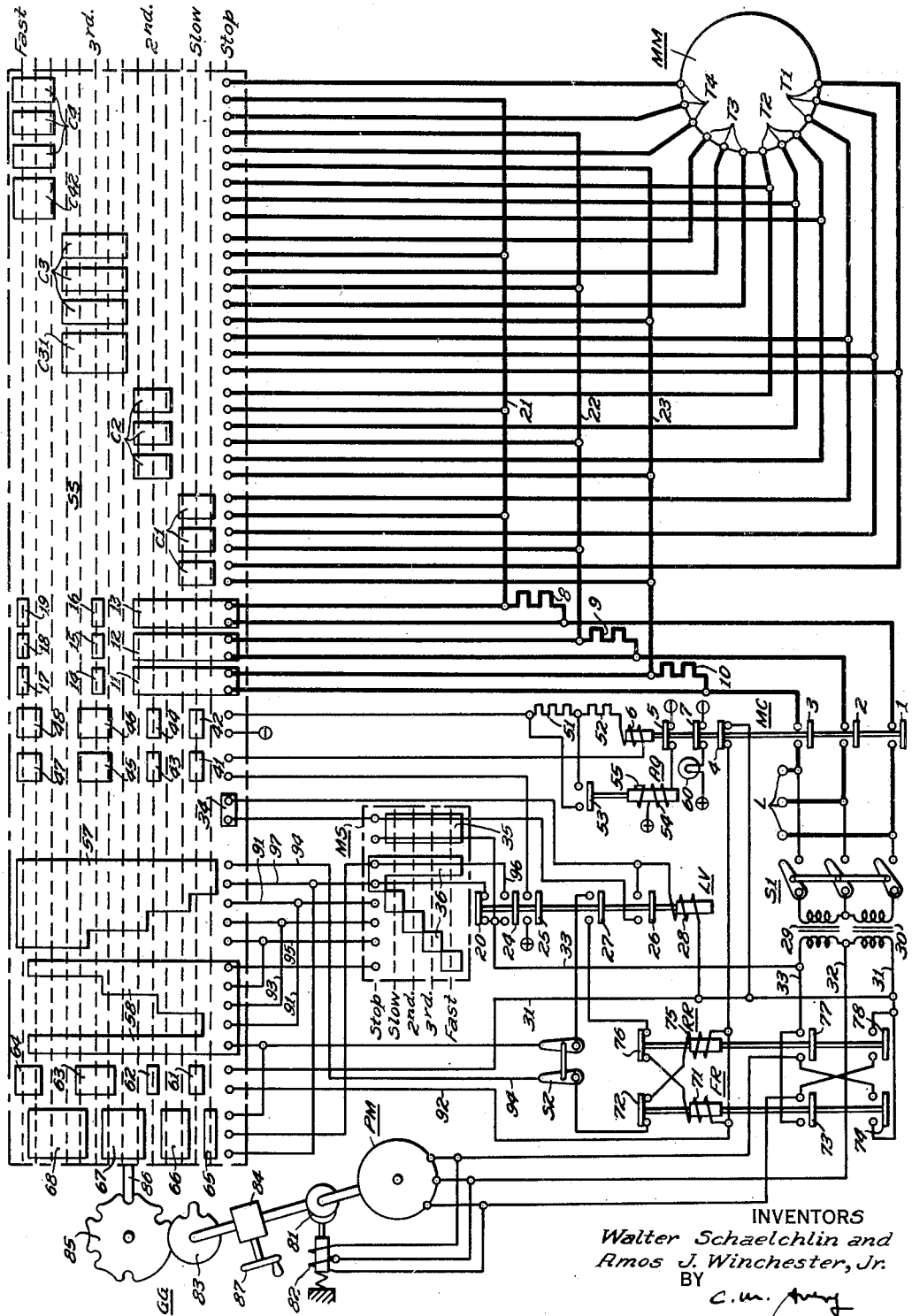
INVENTORS
Walter Schaelchlin and
Amos J. Winchester, Jr.
BY
C. M. Avery
ATTORNEY Patented Nov. 15, 1949

2,488,438

UNITED STATES PATENT OFFICE 2,488,438

CONTROL SYSTEM FOR ALTERNATING-CURRENT MULTISPEED MOTORS

Walter Schaelchlin, Alden, N. Y., and Amos J. Winchester, Jr., Pittsburgh, Pa., assignors to Westinghouse Electric Corporation, East Pittsburgh, Pa., a corporation of Pennsylvania Application June 11, 1948, Serial No. 32,446

7 Claims. (Class 318—391)

This invention is related to that of our copending application Serial No. 751,798, filed June 2, 1947, now Patent 2,459,589, assigned to the same assignee.

This invention concerns electric systems and apparatus for controlling multi-speed alternating-current motors of the type in which several windings or winding sections are provided for energizing the motor with respectively different numbers of field poles to operate it at correspondingly different speeds depending upon which winding is energized at a time.

In known control systems of this kind, the selective energization of the motor windings is controlled by a plurality of electromagnetic speed-control contactors, one for each group of motor terminals associated with the respective windings; and these contactors are mechanically interlocked, to prevent the motor from being short-circuited due to sticking of a contactor. The speed-control contactors are connected with a main contactor, timing relays, and an operator-actuable master controller to operate in the desired sequential and time relation to one another.

It is an object of our invention to provide a control system for multi-speed alternating-current motors that permits reducing the number of electromagnetic contactors and can be designed for considerably reduced space requirements as compared with the known systems.

It is also an object of our invention to devise a control system of the kind mentioned that provides a mechanical interlock between the connections to all motor windings so that it not only prevents the motor from being short-circuited but also eliminates the possibility of continuously drawing locked rotor current.

Another object of our invention is the provision of a control system for multi-speed alternating-current motors that permits a selective setting for either manual or automatic starting of the motor.

It is also an object of the invention to devise a motor control system of the kind referred to that permits inserting any desired timing intervals or intermediate switching operations between successive steps of acceleration or deceleration of the motor, while requiring a minimum of control apparatus for such purposes.

The means which our invention provides for achieving these and other objects that will be apparent from the following, are set forth and specified by the claims annexed hereto and will be described and explained in detail hereinafter with reference to the embodiment of a motor control system illustrated in the drawing.

The drawing represents schematically the circuit diagram of a control system for an alternating-current motor of the squirrel cage type designed for operation at four selective speeds. For instance, in the illustrated embodiment, it is assumed that the motor has two field windings (not shown), each of which is subdivided so that the motor can be energized either with thirty-two field poles for operation at slow (first) speed, with sixteen field poles for operation at twice the minimum speed (second speed), with eight field poles for operation at four times minimum speed (third speed), or with four field poles for operation at eight times minimum speed (fourth or fast speed). The field windings or winding sections are connected to four groups of field terminals denoted by T1, T2, T3 and T4, respectively. When the motor is to run at slow (first) speed, only the terminal group T1 is to be energized, while the motor will run at second, third or fourth speed when one of the terminal groups T2, T3, T4, respectively, is energized.

The alternating current for energizing the motor MM is supplied from line terminals L through the main contacts 1, 2, 3 of a main contactor MC, which has auxiliary contacts 4, 5 and 7, and a control coil 6.

Connected between the motor MM and the main contactor is a set-up switch SS. This switch is preferably of the cam-operated type, although a drum-type switch may be used instead. In the drawing, the cams of the switch SS, such as those denoted by C1, C2, C3, C31, C4, C42 are shown in developed form; and the contacts to be opened or closed by the cams are represented schematically by contact terminals. The switch SS can be placed in any one of five main positions denoted by stop, slow, second, third and fast. The contacts to be controlled by the cams are normally open. When the switch is in slow position, the cams C1 close the appertaining contacts so that the motor terminals T1 are connected through contacts 1, 2, 3, of contactor MC to the line terminals L. When switch SS is in second position, the contacts of cams C2 connect the motor terminals T2 through contactor MC to the line contacts L. In the third position of switch SS the contacts of cams C3 connect motor terminals T3 to the line terminals while the contacts of cam C31 short circuit the motor terminals T1. When switch SS is in fast position, the terminals T4 are connected to the line terminals while the motor terminals T2 are shorted due to the operation of cam C42.

The set-up switch SS is equipped with a number of additional cams, which will be referred to below. The set-up switch SS is driven through a Geneva gear, denoted as a whole by GG. This gear is actuated either manually or by means of a pilot motor PM. The pilot motor is controlled by two mutually interlocked control relays FR and RR to operate in one or the other running direction. The relays FR and RR are operated under control by a selective main switch MS. The system is further equipped with a switch S1 which has to be closed in order to make the pilot motor and the appertaining control devices operative, and with a switch S2 which permits setting the system for manual or automatic operation of the set-up switch SS. Included in the control system are further a low voltage relay LV and an auxiliary timing relay AQ.

A more detailed description of the system components will be given presently.

The selector switch SS is driven by the Geneva gear GG to move intermittently in steps of equal extent. Two steps of movement are necessary to place the switch SS from stop to slow position. Three steps are required to move switch SS from slow to second position. Four steps of movement are provided between second and third position, and five steps for shifting switch SS from third position to fast. As will be explained below, the provision of intermediate positions of rest, that must be traversed by the master switch for moving from one main position to the next main position, has the purpose of securing desired timing periods between subsequent accelerating and decelerating points of the motor and also permits a sequential and properly timed performance of transient circuit connections in the intermediate intervals. The just mentioned numbers of steps of movement, occurring between the main positions of the selector switch, are given merely by way of example. If desired, a smaller or larger number of intermediate steps may be provided between any two successive main positions of the selector switch, depending upon the requirements of each particular application, such as the load or operating conditions of the motor to be controlled. It is favorable, however, to provide a larger number of intermediate steps between successive main positions for higher motor speeds than between successive positions for lower motor speeds, and the larger number of steps at the higher speed may serve to sequentially insert or take out several resistance steps of series resistors such a those exemplified by resitors 8, 9, 10.

Three resistors 8, 9 and 10 are short circuited by contacts of switch SS in all five main positions of the selector switch. The short-circuiting contacts are controlled by switch cams 11 through 19. The design and arrangement of these cams is such that the short circuit is eliminated in predetermined intermediate positions of the switch SS, as will be explained in a later place. In these intermediate positions, the resistor 8 lies in series between contact 1 and a lead 21. Resistor 9 lies in series between contact 2 and a lead 22, and resistor 10 is series connected between contact 3 and a lead 23. The leads 21, 22 and 23 form part of the motor circuit so that the motor current is limited by the series resistors 8, 9, 10 during those intermediate intervals in which the resistors are effective.

The low voltage relay LV has contacts 23, 24, 25, 26 and 27, controlled by a coil 28 which causes the relay to pick up only when the line voltage at terminals L has a sufficient value. Consequently, the occurrence of voltage failure at the line terminals causes relay LV to drop out. At a result, the control system is deenergized. Thereafter the motor MM can be restarted only after the selector switch SS has been placed back to its stop position.

Excitation for the coil circuits of relays LV, FR, RR, and for the pilot motor PM is derived from the line terminals L through the switch S and through two transformers 29 and 30 whose secondary leads are denoted by 31, 32 and 33. Coil 28 of relay LV is connected between leads 31 and 33 through a contact of switch SS under control by a cam 34. The circuit of coil 28, in the illustrated condition of the system, extends also through a contact of the master switch MS which is closed by a cam 35 only when the master switch is moved from its stop position to any one of its four other positions denoted by slow, second, third, and fast. The five positions of the master switch MS correspond to the main positions of the selector switch SS. As will be apparent from the following, the selective adjustment of the master switch MS to any of its five positions causes the pilot motor PM, when the system is set for automatic operation, to move the selector switch SS to its corresponding main position. The selector switch SS then passes through the above-mentioned intermediate positions and when so moving cannot be arrested in any intermediate position. The master switch MS has a group of additional contacts under control by cams which, as a group, are denoted by 36.

The selector switch SS is equipped with contacts and appertaining cams 41 through 48, which serve to control the circuit for coil 6 of main contactor MC. The coil circuit includes two resistors 51 and 52. The contact 53 of relay AQ is connected across resistor 51 to short circuit this resistor when relay AQ is in picked-up condition. The main coil 54 of relay AQ is energized under control by the normally closed contact 5 of contactor MC from a suitable direct-current source which is schematically represented by terminals denoted by $\oplus$ and $\ominus$. The same direct-current source serves to energize the circuit of contactor coil 6, and it also energizes an indicator lamp 60 controlled by the normally closed contact 7 of contactor MC. The direct-current source may consist of a rectifier (not shown), which is connected to the line terminals L. Relay AQ is shown to be equipped with a short-circuited winding 55 in order to operate with a delayed dropout performance. If desired, a timing relay of a different type may be used instead of the one illustrated, or the timing relay with the appertaining resistors 51 and 52 may be omitted. The purpose of relay AQ is to provide for coil 6 of contactor MC a high pick-up current but a low holding current.

The set-up switch SS is further equipped with contacts whose appertaining cams are denoted by 57, 58 and 61 through 68. These contacts cooperate with the master switch MS and with relays FR and RR in controlling the pilot motor PM.

Relay FR has a coil 71 for controlling three contacts 72, 73, 74. Relay RR has a coil 75 for controlling three contacts 76, 77 and 78. When relay FR picks up, its contact 72 prevents the relay RR from operating, and the contacts 73 and 74 connect the pilot motor PM to the transformers 29 and 30 for operation in the forward direction. When relay RR picks up, its contact 76 prevents coil 71 of relay FR from becoming energized, and contacts 77 and 78 energize the pilot motor PM from transformers 29 and 30 for operation in the reverse running direction.

Motor PM is equipped with a spring-set friction brake 81 whose releasing coil 82 is excited whenever the motor PM is energized. The motor shaft actuates the driver 83 of the Geneva gear GG through a transmission 84. The driven member 85 of the gear is connected to the set-up switch SS through a transmission which is schematically represented by a shaft 86. The gear member 85 is shown with only a few positions of rest. In reality, its design is such that it has as many positions of rest as are required of the switch SS. That is, for the illustrated example, a total of 15 rest positions of equal angular spacing should be provided. If desired, a smaller number of rest positions can be chosen for the Geneva gear if a suitable gearing is inserted between the gear member 85 and the switch SS. The Geneva driver 83 can also be operated manually, for instance, by means of a hand wheel 87, which is connected with the gear box 84. The switches S1 and S2 should be open when the switch SS is to be manually operated.

The illustrated control system includes a number of interconnecting leads, some of which are denoted by 91 through 97 and will be referred to in the following description of the performance of the system.

In the following, for brevity, the contact means appertaining to the switches SS and MS are referred to by the reference numerals of the appertaining control cams. In order to have the system operate with an automatic adjustment of the set-up switch SS, the switches S1 and S2 are closed. When the line terminals L are properly energized and the illustrated switches and relays are in the positions shown on the drawings, the motor MM and PM are at rest, the contactor MC is dropped out and the relays LV, FR and RR are likewise in the illustrated dropped out positions. The timing relay AQ, however, is energized so that its contact 53 is closed and the resistor 51 short circuited.

When under these initial conditions the master switch MS is moved from the stop position to slow, relay LV picks up because its coil 28 is energized in the circuit:

$$31—28—34—35—33 \quad (1)$$

Relay LV holds itself in at contact 26 and hence stays picked up during all subsequent steps of operation until the master switch MS is moved back to the stop position or until the occurrence of voltage failure at the line terminals L. Coil 71 of relay FR is energized through contact 27 of relay LV in the circuit:

$$31—4—71—76—27—S2—58—$$
$$91—36—96—24—33 \quad (2)$$

Relay FR picks up and energizes the pilot motor PM to run in the forward direction. At the same time the brake 81 is released. Motor PM now moves the Geneva gear two steps until the circuit (2) is interrupted at contact 58. Switch SS is then in the slow position.

While moving, switch SS passes through an intermediate step in which the contact 65 short circuits the part of circuit (2) that extends through switch MS. Consequently, switch SS cannot be stopped by manipulating the master switch MS while the set-up switch SS is in motion or in an intermediate position of rest.

When switch SS is in slow position, coil 6 of main contactor MC is energized in the circuit:

$$\oplus—25—41—6—52—51—42—\ominus \quad (3)$$

Contactor MC picks up and energizes the motor MM at terminals T1 for slow speed in the three-phase circuit $$L—(1, 2, 3)—(11, 12, 13)—$$
$$(21, 22, 23)—C1—T1 \quad (4)$$

When contactor MC picks up, as mentioned above, its coil 6 is traversed by a relatively high pick-up current because the resistor 51 is then shorted out of the coil circuit by the contact 53 of timing relay AQ. Contact 5 of contactor MC opens the circuit of coil 54. The timing relay drops out after the elapse of its timing period and then inserts the resistor 51 into the circuit of coil 6. This permits using a smaller contactor than would otherwise be necessary. In cases where this advantage is not essential, the series resistors 51, 52 and the additional relay AQ may be omitted.

When the master switch MS is moved from slow to second position, the coil 71 of relay FR is again energized, because the contact 36 of switch MS now closes the coil circuit:

$$31—61—92—71—76—27—S2—$$
$$58—93—36—96—24—33 \quad (5)$$

Relay FR picks up and the pilot motor PM moves switch SS to the second position through two intermediate steps while the master switch MS becomes shorted at contact 66 until switch SS reaches the second position. In the first intermediate step of switch SS, the contactor MC drops out because its coil circuit (3) is opened at contacts 41 and 42; and the motor circuit (4) is opened at contacts 1, 2, 3. In the second intermediate step of switch SS, a new three-phase motor circuit (6) for terminals T2 is prepared at contacts C2 of switch SS. When the second position is reached by switch SS, relay FR drops out because its coil circuit (5) is opened between contact 58 and lead 93 so that motor PM stops. Contactor MC picks up because its coil 6 is now energized through contacts 43 and 44. Contacts 1, 2 and 3 now close the motor circuit:

$$L—(1, 2, 3)—(11, 12, 13)—(21, 22, 23)—C2-T2 \quad (6)$$

Motor MM now runs at second speed.

When the master switch MS is moved from second to third position, the pilot motor PM is caused to intermittently turn the switch SS from second to third position through three intermediate steps as follows. First, coil 71 of relay FR is energized in the circuit:

$$31—62—92—71—76—27—S2—58—$$
$$95—36—96—24—33 \quad (7)$$

Relay FR now energizes motor PM to move switch SS from second position to the next intermediate position. When the intermediate position is reached, the circuit of coil 6 is opened at contacts 43, 44 so that contactor MC drops out and deenergizes the motor MM. Relay FR remains energized in the circuit:

$$31—4—71—76—27—S2—$$
$$58—95—36—96—24—33 \quad (8)$$

This circuit (8) remains in operation until switch SS reaches the third position and interrupts the circuit (8) between contact 58 and lead 95. Motor PM thus moves the switch SS to the second intermediate position and disconnects terminals T2 at contacts C2 while shorting the terminals T1 at contact C31. At the same time, the switch SS prepares at contacts C3 a circuit (9) for terminals T3 and opens the short circuit of resistors 8, 9, 10, at contacts 13, 12, 11, respectively. As motor PM turns the switch SS to the third intermediate position, the contacts 45 and 46 close the circuit of coil 6 so that contactor MC closes the motor circuit:

L—(1, 2, 3)—(8, 9, 10)—(21, 22, 23)—C3—T3 (9)

Motor MM is now energized at terminals T3 in series with resistors 8, 9, 10. Motor PM keeps running and shifts switch SS to the third position. In that position, the contacts 16, 15, 14 short the resistors 8, 9, 10 to apply full voltage to terminals T3. Motor MM now runs at the third speed.

When the master switch MS is moved from third to fast position, the contacts 36 of switch MS reenergize coil 71 of relay FR. Motor PM starts running and turns switch SS from third to fast position through four intermediate steps, thus providing a longer accelerating period than previously. The movement of switch SS from the third position to the first intermediate position causes the contacts 16, 15, 14 to insert the resistors 8, 9, 10 in the motor circuit (9). The movement of switch SS to the second intermediate step causes contacts 45 and 46 to interrupt the coil circuit of contact MC so that contacts 1, 2, 3 open the motor circuit (9). The movement of the switch SS to the third intermediate step causes the contacts C31 and C3 to open the short circuit of terminals T1 and to deenergize the terminals T3. Instead, the terminals T2 are now shorted at contact C42 and a new circuit (10) is prepared for terminals T4 by contacts C4. The movement of switch SS to the fourth intermediate step causes the contacts 47 and 48 to deenergize coil 6 of contact MC so that contacts 1, 2, 3, close the motor circuit:

L—(1, 2, 3)—(8, 9, 10)—(21, 22, 23—C4—T4 (10)

The movement of switch SS from the fourth step to fast causes contacts 19, 18, 17 to short the resistors 8, 9, 10 in circuit (10) so that now full voltage is applied to terminals T4 for operating the motor MM at maximum speed.

During all intermediate positions of switch SS, the master switch MS is by-passed by contact 66, 67 or 68 so that the movement of switch SS cannot be stopped by manipulation of the master switch MS.

The deceleration performance of the system will be understood from the following.

When the master switch MS is moved from fast to third position, the set of switch SS is turned in the reverse direction from fast to third position through four intermediate positions of rest. The adjusing movement of switch MS causes coil 75 of relay RR to become energized in the circuit:

31—64—92—75—72—S2—94—57— 95—36—96—24—33 (11)

Relay RR picks up and energizes the pilot motor PM to move switch SS in the reverse direction to the first intermediate step. Contacts 19, 18, 17 open and insert the resistors 8, 9, 10 in series between the line terminals L and the motor terminals T4. Motor PM continues running and turns switch SS to the second intermediate position. In that position contact MC drops out because the circuit of its coil 6 is opened at contacts 47 and 48. Contact 64 opens the circuit 11, but the coil 75 of relay RR remains energized in the circuit:

31—4—75—72—S2—94—57—95—36—24—33 (12)

Motor PM turns switch SS to the third intermediate step. Now the contacts C42 and C4 open while contacts C31 and C3 close and prepare a new circuit (13) for motor MM. The motor PM turns switch SS to the fourth intermediate step. Contacts 45 and 46 close the circuit of coil 6 so that contactor MC picks up and energizes the motor MM, with terminals T1 shorted at contact C31, in the circuit:

(13)
L—(1, 2, 3)—(8, 9, 10)—(21, 22, 23)—C3—T3

Motor PM continues running until switch SS reaches the third position. Then the circuit (11) for coil 75 of relay RR is opened at contact 57, and the pilot motor PM stops. Now the contacts 16, 15, 14 short the resistors 8, 9, 10 out of the circuit (13), and motor MM runs at the third speed. When master switch MS is moved from third to second position, the pilot motor PM turns the switch SS from third to second position through three intermediate steps as follows: Coil 75 of relay RR is energized in the circuit:

31—63—92—75—72—S2—94— 57—93—36—96—24—33 (14)

Motor PM moves in the reverse direction and turns switch SS from the third position one step toward the second position. Contacts 16, 15, 14 open the short circuits of resistors 8, 9, 10. Then switch SS moves to the second intermediate step. Contacts 45 and 46 open the coil circuit of contactor MC so that the contactor drops out and opens the motor circuit (13) at contacts 1, 2, 3. When switch SS moves to the next step, contacts C31 and C3 open, contact C2 closes, and contacts 11, 12, 13 close. Movement of switch SS to the second position causes contacts 43 and 44 to pick up the contactor MC so that contacts 1, 2, 3 close the energizing circuit for motor terminals T2 with resistors 8, 9, 10 shorted.

When the master switch MS is moved from second position to slow and from slow to stop, the operation of the system is analogous to the above described acceleration procedure except that the switching operations occur in the reverse sequence.

When the motor MM is to be stopped from any speed, the master switch MS may be rapidly moved to the stop position. As a result, the relay LV drops out because its coil circuit (1) is opened between lead 33 and contact 25. Relay contact 25 opens the circuit of the coil. Relay contact 25 interrupts the circuit of coil 6 so that the main contactor MC drops out and disconnects the motor MM from the line terminals L. The coil 75 of relay RR becomes energized through contact 4 of contactor MC in the circuit:

31—4—75—72—S2—94—57—97—20—33 (15)

Relay RR energizes motor PM which moves switch SS back to the stop position and then opens the circuit (15) (at contact 57) thus arresting the motor PM and placing the system in starting condition.

When voltage failure occurs with switches MS and SS in any running position, relay LV and contactor MC drop out, and the relay FR or RR, if picked up at that time, will also drop out. When the voltage returns, relay RR picks up because its coil becomes energized in the circuit (15). Consequently, the motor PM returns the switch SS to the stop position. Since the relay LV will not pick up again until the master switch MS is also turned back to the stop position, the system must be reset to its initial condition before the motor MM can again be started.

With switch S1 closed and switch S2 open, the set-up switch SS can be operated manually by turning the hand wheel 87. The sequence for manual operation is the same as for automatic operation. The indicating light 60 is located so that it is conveniently visible to the operator. The points where the contactor CM drops out are preferably marked on the hand-wheel dial plate, and the operator should not turn the hand wheel past these points until the indicating light is out. This insures that the contactor CM is open before any of the main contacts C1, C2, etc., of the set-up switch SS are opened.

It will be obvious to those skilled in the art, after a study of the foregoing disclosure, that systems according to the invention can be modified in various respects and can be embodied by means of components of a design different from that shown in the drawing without departing from the essence of the invention and within the scope of its essential features as set forth in the claims annexed hereto.

We claim as our invention:

1. A motor control system, comprising an alternating-current motor having a plurality of terminal groups, for operation at respectively different speeds, line terminals for supplying alternating current, an electro-magnetic contactor having contacts disposed between said line terminal groups and said line terminals and having a coil circuit for controlling said contacts, a selective set-up switch having a plurality of main positions corresponding to said respective groups and having intermediate positions between said main positions, said switch having groups of main contact means connected between said contactor contacts and said respective terminal groups and closed in one of said respective main positions of said switch and in at least one adjacent one of said intermediate positions, said switch having control contacts connected with said coil circuit and arranged for temporarily opening said contactor contacts as said switch passes from a main position to said one intermediate position so that the interruption of current from said line terminals occurs at said contactor contacts previous to switching of said terminal groups, and a selectively controllable stepping drive connected with said switch for moving it stepwise in a given sequence from any one of said main positions through said intermediate position to the next main position so as to provide intervals of rest between the switch positioning movements.

2. In a motor control system according to claim 1, said switch having a rotatable member and having steps of equal angular spacing from one another, and said stepping drive having a Geneva gear with a driven gear member connected to said switch member.

3. In a motor control system according to claim 1, said groups of main contacts being arranged relative to each other so that movement of said switch in one direction causes said line terminals to be successively connected to motor terminals for progressively changing speeds, and the number of intermediate positions and steps of said switch being smaller between adjacent main positions for lower speeds than between adjacent main positions for higher speeds.

4. In a motor control system according to claim 1, a group of resistors series connected between said contactor contacts and said terminal groups, and auxiliary contacts on said switch for shorting said resistors in said main positions of said switch.

5. In a motor control system according to claim 4, said switch having at least two intermediate positions between two successive main positions, and said control contacts being closed in the one of said two intermediate positions that is adjacent to the one of said two main positions that corresponds to the higher motor speed.

6. A motor control system, comprising an alternating-current motor having a plurality of terminal groups for operation at respectively different speeds, line terminals for supplying alternating current, control means disposed between said line termnals and said terminal groups to sequentially connect said respective terminal groups to said line terminal for a progressive order of motor speeds, said control means including a set-up switch having a plurality of main positions and also positions intermediate said main positions, said switch having contact groups disposed for connecting sa'd line terminals to said respective terminal groups in said respective main positions, a stepping drive connected to said switch for moving it from one to a selected other main pos'tion with rests in each position intermediate said one and said other main position, a selective master switch connected with said drive for controlling it to move said set-up switch, said master switch having a plurality of positions corresponding only to said main positions so as to permit a selective control movement of said set-up switch only between main positions.

7. A motor control system, comprising an alternating-current motor having a plurality of terminal groups for operation at respectively different speeds, line terminals for supplying alternating current, control means disposed for sequentially connecting said respective terminal groups to said line terminals for a progressive order of motor speeds and including a set-up switch having a plurality of main positions and also positions intermediate said main positions, said switch having contact groups disposed for connecting said line terminals to said respective terminal groups in said respective main positions, the number of intermediate positions being larger between two successive main positions corresponding to a higher motor speed than between two successive main positions corresponding to a lower motor speed, and all positions being equally spaced from one another, a stepping drive connected with said set-up switch, a control circuit for said drive including a selective master switch and auxiliary contact means on said set-up switch, said master switch being movable between a plurality of selective positions corresponding to said main positions of said set-up switch and having selector contacts correlated to said selective positions respectively to close said control circuit through said auxiliary contacts for causing said drive to move said set-up switch, and said auxiliary contacts being disposed to open said circuit only when the position of said set-up switch corresponds to the selected position of said master switch.

WALTER SCHAELCHLIN.
AMOS J. WINCHESTER, JR.

REFERENCES CITED

The following references are of record in the file of this patent:

UNITED STATES PATENTS

| Number | Name | Date |
| --- | --- | --- |
| 2,454,216 | Schaelchlin et al. | Nov. 16, 1948 |
| 2,459,589 | Schaelchlin et al. | Jan. 18, 1949 |